United States Patent [19]

Cassanelli et al.

[11] 4,278,692

[45] Jul. 14, 1981

[54] METHOD FOR INCREASING PREPARATION TOLERANCE OF A DRY MIX HAVING A GUM TO FORM AN OIL-AQUEOUS EMULSION

[75] Inventors: Robert R. Cassanelli; Ronald P. Wauters, both of Dover; Richard A. Cole, Clayton; David N. Evans; Darrel E. Herbst, both of Dover, all of Del.

[73] Assignee: General Foods Corporation, White Plains, N.Y.

[21] Appl. No.: 905,306

[22] Filed: May 12, 1978

[51] Int. Cl.$^3$ ............................................. A23L 1/216
[52] U.S. Cl. ..................................... 426/96; 426/602; 252/316
[58] Field of Search ................. 426/99, 602, 611, 589, 426/613, 103, 96; 252/316

[56] References Cited

U.S. PATENT DOCUMENTS

| | | | |
|---|---|---|---|
| 2,168,360 | 8/1939 | Musher | 426/613 |
| 2,554,143 | 5/1951 | Hinz et al. | 426/103 |
| 2,935,408 | 5/1960 | Steinitz | 426/589 |
| 2,992,188 | 7/1961 | Miller et al. | 426/96 |
| 3,067,038 | 12/1962 | O'Connell | 426/602 |
| 3,108,004 | 10/1963 | Klostermann | 426/602 |
| 3,582,362 | 6/1971 | Drews et al. | 426/589 |
| 3,949,094 | 4/1976 | Johnson et al. | 426/99 |

FOREIGN PATENT DOCUMENTS 1429638  3/1976  United Kingdom .

OTHER PUBLICATIONS

"Xanthan Gum", by Kelco Company, pp. 8 & 17.
"Weight Watchers Program Cookbook", by J. Nidetch, 1975, p. 227.

Primary Examiner—S. Leon Bashore
Assistant Examiner—Michael L. Goldman
Attorney, Agent, or Firm—Mitchell D. Bittman

[57] ABSTRACT

A dry mix for use in preparing a stable viscous emulsion with increased preparation tolerance comprising an encapsulated gum, the encapsulant being effective to retard hydration of the gum when manually mixed with an aqueous solution and then an oil, the rate of hydration of the gum and the amount of gum being effective to provide a stable viscous emulsion for at least 24 hours after mixing. The dry mix also comprising an amount of solids effective to obtain a desired viscosity.

13 Claims, No Drawings

METHOD FOR INCREASING PREPARATION TOLERANCE OF A DRY MIX HAVING A GUM TO FORM AN OIL-AQUEOUS EMULSION

BACKGROUND

The invention relates particularly to the production of emulsions in which an aqueous phase and then an oil phase are mixed together. More particularly this invention relates to edible emulsions such as dressings for foods, for example, salad dressings, creamy Italian dressings, cheese dressings, French dressings and the like. In preparing edible emulsions it is important that they be prepared so that the aqueous and oil phases are resistant to separation. Of critical importance when a dry mix is combined with the aqueous phase and then the oil phase to form an emulsion is that the emulsion be stable and resistant to separation even over variations in the ratio of aqueous solution to oil used to prepare the emulsion. In this way the consumer when preparing an emulsion from the dry mix will be able to obtain a stable emulsion even with preparation variations (i.e., variation in the aqueous to oil ratio).

While the use of gums to form emulsions is known in the art (e.g., U.S. Pat. Nos. 2,944,906, 3,067,038, and 3,676,157) their use has generally been severely restricted in dry mixes due to their inability to form stable emulsions which are resistant to separation over variations in the aqueous to oil ratio. It will also be appreciated by those skilled in the art that when a salad dressing is desired the resultant emulsions should be homogeneous, creamy and viscous, but without at the same time increasing the viscosity to the point where pouring is impaired.

SUMMARY

Accordingly, it is an object of this invention to provide a dry mix to be used in preparing an aqueous-oil emulsion which is stable and resistant to separation.

It is a further object to provide a dry mix which can be used to form an emulsion which is stable under tolerant conditions.

It is another object to provide a dry mix for preparing emulsions with a desired viscosity.

It is a further object of this invention to provide a dry mix for use in preparing a dressing for foods and having desirable taste and texture characteristics.

Briefly, the objects of this invention are accomplished by employing a dry mix comprising an encapsulated gum, the encapsulant acting to retard hydration of the gum when mixed with an aqueous solution and then an oil, and an amount of solids effective to obtain a desired viscosity. The rate of hydration of the gum and the amount of gum are effective to provide a stable viscous emulsion for at least 24 hours after mixing.

DETAILED DESCRIPTION OF THE INVENTION

An essential feature of the dry mix of this invention is the inclusion therein of an encapsulated gum. The encapsulant is employed to retard hydration of the gum so that when the dry mix is mixed manually in a suitable container with the aqueous solution and then the oil a stable emulsion is formed. The encapsulant by slowing down the hydration of the gum allows an emulsion between the oil and aqueous phases to form prior to a substantial amount of gum dissolving. The emulsion thus formed is stabilized by the gum thickening thereby enabling a stable emulsion to be formed even when there are preparation variations. Without the encapsulant the gum will quickly hydrate and thicken the aqueous solution thereby inhibiting the oil phase from dispersing with the aqueous phase to form a stable emulsion. While the resultant emulsion may be stable at preferred control conditions it is extremely sensitive to preparation variations (variation in oil to aqueous ratio) and will generally not be stable (separation of oil phase and aqeous phase).

The encapsulant employed is a slowly water soluble or dispersable coating which completely surrounds (encapsulates) the gum particles and retards their hydration to provide a stable emulsion. The encapsulant employed can be, for example, an edible shellac, an emulsifier (e.g. mono and diglycerides), sugar syrups, waxes, oils, fats etc. The encapsulant may be applied to encapsulate the gum particles by means known in the art. For example, encapsulation may be carried out by spraying edible shellac onto the gum particles in a coating reel, followed by drying. The amount of encapsulant will vary depending upon the type of encapsulant and the encapsulation process employed. While preferably all of the gum particles are encapsulated, the amount by weight of gum particles which are not encapsulated should not be sufficient to provide an emulsion which is not stable under tolerant conditions (i.e., variations of oil to aqueous ratio). For example, when xanthan gum is employed, the level of xanthan gum is generally within the range of 0.3 to 1.2 grams per 252 mls of emulsion (the emulsion comprising solids and about 50:50 aqueous to oil) and no more than about 0.18 grams of the xanthan gum can be unencapsulated in order to obtain emulsions which are stable at tolerant conditions ($\pm 20\%$ of the oil or aqueous levels).

The particle size of the encapsulated gum particles should be of a size wherein the gum will hydrate at a sufficient rate to produce a stable viscous emulsion for at least 24 hours after mixing even under tolerant conditions. If the encapsulated gum particles are too small the gum may hydrate too quickly resulting in an unstable emulsion over tolerant conditions. If the encapsulated gum particles are too large the gum may hydrate to slowly to produce an acceptable viscosity and textural quality. For example, when xanthan gum is encapsulated with mono and diglycerides preferably at least 70% by weight of the gum particles are within the size range of 70 to 200 mesh U.S. standard screen in order to produce an acceptable viscosity and a stable emulsion. Other factors besides particle size which also affect the rate of hydration of the gum and which must be adjusted accordingly to produce a stable viscous emulsion include the amount of aqueous solution available to hydrate the gum, the solubility of the encapsulant and the solubility of the gum.

The gum or mixture of gums employed in the dry mix of this invention is one wherein encapsulation will, at desired levels of use of the gum, enable the gum to form a stable emulsion under tolerant conditions. Suitable gums include carboxymethyl cellulose, guar gum, tragacanth, karaya and propylene glycol alginate, with the most preferred gum being xanthan gum as in products such as salad dressings it imparts a desirable taste, texture and viscosity to the emulsion over time, and is stable under tolerant conditions. Gums which produce stable viscous emulsions under tolerant conditions at desired levels of use without being encapsulated or gums which do not produce acceptable viscosities are not included herein.

The encapsulated gum is to be employed in the dry mix at levels effective to provide a stable viscous emulsion for at least 24 hours after mixing. For example, when excapsulated xanthan gum is employed to provide a stable viscous emulsion generally from about 0.3 to 1.2 grams of xanthan gum are encapsulated and used in a dry mix per 252 mls of emulsion (the emulsion containing solids and about 50:50 aqueous to oil). The viscosity of the emulsion prepared with xanthan gum is preferably within the range of about 1000 to 2600 centipoise within 15 minutes after mixing (at a temperature of about 72° F.) 2000 to 4400 centipoise within 60 minutes after mixing (at a temperature of about 43° F.) and 5000 to 10,000 centipoise within 24 hours after mixing (at a temperature of about 43° F.), as measured on a Brookfield LVF viscometer with a #3 spindle with guard and operated at 12 r.p.m. Viscosities above the preferred viscosity range for xanthan will generally be too thick to produce an acceptable end product, while viscosities below the above preferred range will generally be too thin to be acceptable. Due to the varied taste and textural attributes of the different gums, in order to obtain an acceptable product different viscosity curves would generally be applicable for each gum. However, the emulsion should have at least a minimum viscosity of about 1000 centipoise within 15 minutes after mixing (as measured above), and if a pourable product is desired the viscosity should not exceed 10,000 centipoise within 24 hours after mixing (as measured above). A further advantage of this invention is that encapsulation of the gum will aid in the formation of an emulsion which is homogeneous and creamy. These characteristics are especially desireable in products such as salad dressings.

The dry mix also comprises an amount of solids effective to obtain a desired viscosity in the resultant emulsion. When preparing a dressing the solids may include salt, sugar, dextrose, corn syrup, invert sugar syrup, honey, mustard, dried egg, milk, solids, paprika, pepper, garlic, onion and other spices, seasoning or flavors, turmeric, caramel and other colors, monosodium glutamate, tomato solids, edible acids, buffers, etc. Generally the amount of solids should be at least 30 grams of solids per 252 ml of emulsion. Certain gums such as xanthan gum may require in addition to the solids a mimimum level of salt (i.e. generally at least 1 gm of salt per 252 ml of emulsion) to aid in the solubilization or dispersion of the gum in the emulsion.

The dry mix may contain an edible acid, base, or buffer (e.g. citrates, carbonates, phosphates, citric acid, lactic acid, malic acid, adipic acid, etc.) in an amount effective to give a desired pH to the emulsion (preferably within the pH range of about 3.0 to 4.4). The dry mix may also contain minor amounts of ingredients such as flow agents (e.g. tricalcium phosphate, sodium silico aluminate, silicon dioxide), preservatives (e.g. butylated hydroxy anisole, tertiary butylhydroquinone, sodium benzoate, sorbic acid, ethylenediaminetetraacetic acid) etc. While minor amounts of other ingredients such as starch or emulsifiers may be added to the dry mix they are not necessary in the instant invention to obtain a viscous emulsion which is stable under tolerant conditions.

The dry mix of this invention is mixed, preferably manually mixed by vigorous shaking in a suitable container (e.g. jar, cruet, bottle), with an aqueous solution and then an oil to form an viscous emulsion which is stable under preparation variations (i.e. tolerant conditions). By stable what is meant is that the oil and aqueous phases do not separate for at least 24 hours after mixing, and by viscous what is meant is that the viscosity is at least about 1000 centipoise within 15 minutes after mixing (as measured above). The aqueous solution preferably comprises water and/or vinegar (preferably about a 2 to 1 ratio of vinegar to water), while the oil can be any edible oil suitable for the desired end product. The suitable oils include vegetable oils such as peanut oil, soybean oil, corn oil, olive oil, palm oil, coconut oil, sunflour oil, safflower oil, cottonseed oil, etc. and mixtures thereof. While the ratio of aqueous phase to oil phase can vary dependent upon the desired end product, preferably it is within the range of about 3 to 5 and 5 to 3 parts by volume. When the desired ratio of aqueous solution to oil is set for an end product the level of gum is accordingly determined to obtain a stable emulsion with a desired viscosity. The advantages of the instant invention are that by encapsulating the gum a stable emulsion is still obtained even under tolerant conditions, i.e., even with variations from the desired ratio of up to about ±20% of the aqueous phase or the oil phase. For example, when the desired ratio of aqueous to oil is 90 to 105, stable emulsions can still be obtained with ratios within the range of about 70 to 125 and 110 to 85. Without encapsulation even if a stable emulsion can be formed at control conditions (desired ratio of aqueous to oil and corresponding level of gum) upon variation from the desired ratio separation of the phases is evident as is shown in Table I.

TABLE I

| Type of Gum | Wgt. of Gum (gms) | Wgt. of Encapsulant (edible shellac) (gms) | Viscosity at control Conditions 15 Min. after mixing (centipoise) | Stability at Control Conditions after 24 hours | Stability at Tolerant Conditions after 24 hours |
|---|---|---|---|---|---|
| Karaya | 1.0 | 1.0 | 1000 | Stable | Stable |
|  | 1.0 | 0 | 1400 | Stable | Separated |
| Propylene Glycol Alginate (Kelcoloid S*) | 1.5 | 2.0 | 1100 | Stable | Stable |
|  | 1.5 | 0 | 4300 | Stable | Separated |
| Guar | 1.2 | 1.0 | 1700 | Stable | Stable |
|  | 1.2 | 0 | 3200 | Stable | Separated |
| Xanthan (Keltrol | .6 | .6 | 1600 | Stable | Stable |
|  | .6 | 0 | 3200 | Stable | Separated |

TABLE I-continued

| Type of Gum | Wgt. of Gum (gms) | Wgt. of Encapsulant (edible shellac) (gms) | Viscosity at control Conditions 15 Min. after mixing (centipoise) | Stability at Control Conditions after 24 hours | Stability at Tolerant Conditions after 24 hours |
|---|---|---|---|---|---|
| F*) | .6 | 1.2 (Mono & diglycerides) | 1800 | Stable | Stable |
|  | .6 | 0 | 3200 | Stable | Separated |
| Carboxymethyl Cellulose | .9 | 1.0 | 1400 | Stable | Stable |
|  | .9 | 0 | 1900 | Stable | Separated |
| Tragacanth | 1.5 | 1.5 | 1500 | Stable | Stable |
|  | 1.5 | 0 | 2000 | Stable | Separated |

*Produced by Kelco Co.

Control conditions for Table I consisted of adding 67.8 grams of dry mix (including the gum) to 90 ml. of aqueous solution (60 ml. of vinegar and 30 ml. of water) in a cruet, shaking vigorously for 30 seconds, and then adding 105 ml. of vegetable oil and shaking vigorously for 30 seconds. Tolerant conditions consisted of modifying the control conditions by adding 70 mls of aqueous solution (60 ml. vinegar and 10 ml. of water) and 125 ml. of vegetable oil. Viscosity was measured at ambient conditions (i.e. at a temperature of about 72° F.) on a Brookfield LVF viscometer with a #3 spindle with guard and operated at 12 r.p.m.

EXAMPLE I

A salad dressing mix was prepared by mixing 1.5 gms of tragacanth gum and 7.2 gms of sugar into 59.1 gms of salad dressing base comprising sugar, salt, dried egg, non-fat milk solids, mustard, flavoring (i.e. onion, garlic, pepper, etc.) and coloring (i.e. paprika, caramel, turmeric, etc.).

A similar salad dressing mix as above was prepared except the tragacanth gum was encapsulated with confectioner's glaze (i.e. a mixture of food grade shellac and ethyl alcohol at a 35% solids content). The gum was encapsulated by adding 1.5 gms of the glaze to a mixture of 1.5 gms of the gum and 5.7 gms of sugar, and mixed by hand until the mixture was dry and granular (the alcohol of the glaze evaporated). The encapsulated gum was then mixed into 59.1 gms of the salad dressing base.

Both salad dressing mixes where evaluated under control conditions. That is, 67.8 gms of salad dressing mix were added to 90 ml. of aqueous solution (60 ml. vinegar and 30 ml. water) in a cruet and shaken vigorously for 30 seconds, then 105 ml. of vegetable oil were added and shaken vigorously for 30 seconds. The product was allowed to stand for 15 minutes and then the viscosity was measured at ambient conditions (i.e., at a temperature of about 72° F.) in centipoise on a Brookfield LVF viscometer (#3 spindle with guard, operated at 12 r.p.m.). The dressing with the unencapsulated gum had a viscosity of 2000 centipoise within 15 minutes of mixing and was stable (no separation) 24 hours after mixing. The dressing with the encapsulated gum had a viscosity of 1500 centipoise within 15 minutes after mixing and was stable 24 hours after mixing.

Both salad dressing mixes where then evaluated under tolerant conditions. That is, 67.8 gms of salad dressing mix were added to 70 ml. of aqueous solution (60 ml. vinegar and 10 ml. water) in a cruet and shaken vigorously for 30 seconds, then 125 ml. of vegetable oil were added and the mixture was shaken vigorously for 30 seconds. The product was allowed to stand for 15 minutes and then observed. In the dressing with the unencapsulated gum separation was evident within 15 minutes after mixing. The dressing with the encapsulated gum produced an emulsion which was stable (no separation) for at least 24 hours after mixing.

EXAMPLE II

A salad dressing mix was prepared by mixing 0.6 gms of xanthan gum and 8.1 gms of sugar into 59.1 gms of the salad dressing base of Example I (comprising about 8 gms of salt).

A salad dressing mix with encapsulated xanthan gum was prepared by mixing until dry 0.6 gms of xanthan gum with 7.5 gms of sugar and 0.6 gms of confectioner's glaze, and then the encapsulated xanthan gum was mixed into 59.1 gms of the salad dressing base.

Both salad dressing mixes were evaluated under control and tolerant conditions as in Example I. The salad dressing mix with the unencapsulated gum had a viscosity of 3200 centipoise within 15 minutes after mixing and a stable emulsion under control conditions, but under tolerant conditions failed to produce a stable emulsion. The salad dressing mix with the encapsulated gum produced an acceptable viscosity under control conditions (1600 centipoise within 15 minutes after mixing) and a stable emulsion for at least 24 hours after mixing both under control and tolerant conditions.

EXAMPLE III

Xanthan gum was encapsulated with mono and diglycerides at a ratio of about 1 part xanthan gum to 2 parts encapsulant (the encapsulant containing a minor amount of polysorbate 60 to aid in the dispersion of the glycerides and a minor amount of potassium stearate as a reaction by-product of the manufacture of the glycerides). Encapsulated xanthan gum at a level of 1.8 gms (of which 0.6 gms was xanthan gum) was added to 66 gms of the salad dressing base of Example I. When evaluated under control conditions (as set forth in Example I) the resultant salad dressing had an acceptable viscosity, i.e., 1800 centipoise within 15 minutes after mixing (at a temperature of about 72° F.), 3200 centipoise within 60 minutes after mixing (at a temperature of about 43° F.) and 7500 centipoise within 24 hours after mixing (at a temperature of about 43° F.), as measured above, with a stable emulsion for 24 hours after mixing. When evaluated under tolerant conditions (as set forth in Example I) the resultant emulsion was stable for at least 24 hours after mixing.

What is claimed is:

1. A method for increasing the preparation tolerance of a dry mix to form an oil-aqueous emulsion while obtaining a stable viscous emulsion which comprises:

manually mixing the dry mix with an aqueous solution and then an oil, the dry mix comprising an encapsulated gum and solids, the encapsulant being effective to retard hydration of the gum, the rate of hydration of the gum and the amount of gum being effective to provide a stable viscous emulsion for at least 24 hours after mixing, the solids being present in an amount effective to obtain a desired viscosity.

2. Method of claim 1 wherein the emulsion has a viscosity of at least about 1000 centipoise within 15 minutes after mixing, as measured on a Brookfield LVF viscometer with a #3 spindle operated at 12 r.p.m.

3. Method of claim 2 wherein the ratio of oil to aqueous solution is within the range of about 3 to 5 and 5 to 3 parts by volume.

4. Method of claim 3 wherein the gum is chosen from the groups consisting of xanthan, carboxymethyl cellulose, guar, tragacanth, karaya and propylene glycol alginate.

5. Method of claim 4 wherein the gum is xanthan gum and the solids contain a sufficient amount of salt to solubilize the xanthan gum in the emulsion.

6. Method of claim 5 wherein the rate of hydration of the gum and amount of gum is effective to provide a stable emulsion with a viscosity within the range of about 1000 to 2600 centipoise within 15 minutes after mixing, 2000 to 4400 centipoise within 60 minutes after mixing and 5,000 to 10,000 centipoise within 24 hours after mixing, as measured on a Brookfield LVF viscometer with a #3 spindle and operated at 12 r.p.m.

7. Method of claims 4 or 6 wherein the solids comprise protein, sugar, salt, flavor and color.

8. Method of claim 7 wherein the aqueous solution comprises water and vinegar, and the pH of the emulsion is within the range of about 3.0 to 4.4.

9. Method of claim 7 wherein the encapsulant is chosen from the group consisting of edible shellacs, mono and diglycerides, emulsifiers, sugar syrups, waxes, oils and fats.

10. Method of claim 7 wherein the solids further comprise an edible acid or buffer in an amount effective to give a desired pH.

11. Method of claim 5 wherein the xanthan gum is encapsulated with mono and diglycerides and at least 70% by weight of the encapsulated xanthan gum particles are within the size range of about 70 to 200 mesh U.S. standard screen.

12. Method of claim 11 wherein the effective amount of xanthan gum which is encapsulated is within the range of about 0.3 gms. to 1.2 gms. per 252 ml of emulsion.

13. Method of claim 8 wherein the aqueous solution comprises water and vinegar.

* * * * *